Figure 1:
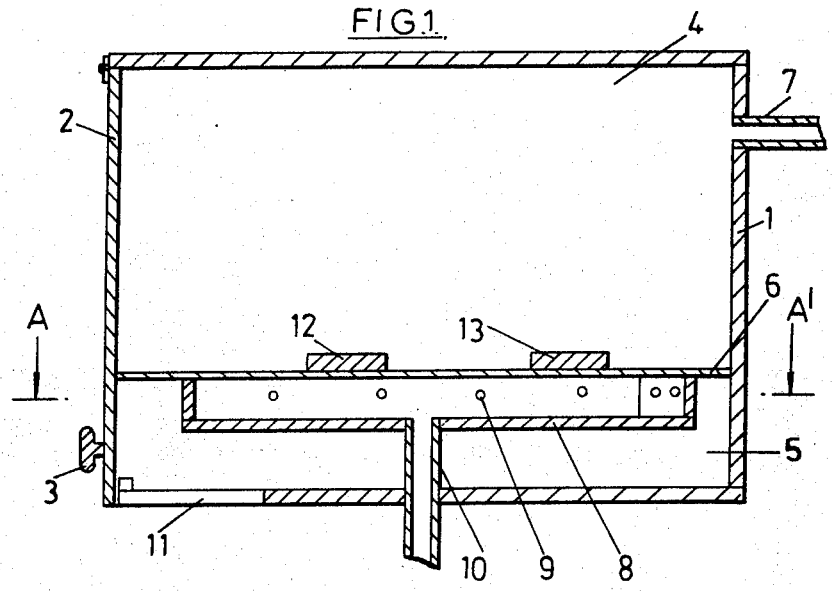

United States Patent [19]

Ray et al.

[11] 3,989,532

[45] *Nov. 2, 1976

[54] ANTI-MISTING INORGANIC OXIDE GLASS COMPOSITIONS

[75] Inventors: Neil Hunter Ray; William Derek Robinson; Cyril John Lewis, all of Runcorn, England

[73] Assignee: Imperial Chemical Industries Limited, London, England

[ * ] Notice: The portion of the term of this patent subsequent to Jan. 27, 1993, has been disclaimed.

[22] Filed: Feb. 4, 1974

[21] Appl. No.: 439,598

[30] Foreign Application Priority Data
Feb. 21, 1973 United Kingdom.................. 8489/73
June 25, 1973 United Kingdom............... 30030/73

[52] U.S. Cl................................ 106/47 Q; 351/62; 106/47 R
[51] Int. Cl.$^2$......................................... C03C 3/00
[58] Field of Search............ 106/47 Q, 47 R; 351/62

[56] References Cited
UNITED STATES PATENTS

| | | |
|---|---|---|
| 1,961,603 | 6/1934 | Berger............................... 106/47 R |
| 2,390,191 | 12/1945 | Stanworth......................... 106/47 R |
| 2,920,972 | 1/1960 | Godron............................. 106/47 R |
| 3,220,861 | 11/1965 | Parry et al. ....................... 106/47 R |
| 3,310,411 | 3/1967 | Vedder et al. .................... 106/47 R |

*Primary Examiner*—Winston A. Douglas
*Assistant Examiner*—John F. Neibling
*Attorney, Agent, or Firm*—Cushman, Darby & Cushman

[57] ABSTRACT

An optical article, for example, a lens, window or mirror, at least part of the surface of which, and preferably the whole of which, is an inorganic oxide glass having a $P_2O_5$ content of at least 52 mole %, and preferably 55 to 68.5 mole %, an alkaline earth content of 2.7 to 20 mole %, and a transformation temperature of not greater than 300° C, the glass optionally containing $B_2O_3$ and at least one alkali metal oxide.

19 Claims, 2 Drawing Figures

U.S. Patent  Nov. 2, 1976  3,989,532

ANTI-MISTING INORGANIC OXIDE GLASS COMPOSITIONS

This invention relates to optical articles and more particularly to optical articles comprising inorganic oxide glasses.

Articles of silicate glass which are exposed to humid atmospheres when the surface of the glass is at a temperature below the dew point of the humid atmosphere tend to become misted by condensation of minute droplets of water which do not spread uniformly over the surface. This may occur, for example, when the glass article is in the form of a relatively thin sheet, one side of which is in contact with cold air and the other with warm, moist air, for example, a vehicle windscreen.

Consequently, glass articles through which clear vision is essential, for example, lenses of protective goggles, vehicle windscreens and mirrors, may have to be wiped frequently or heated in order to remove the condensed water, or treated with anti-misting preparations. Such anti-misting preparations typically comprise surfactants of various types which form a surface layer on the glass thereby reducing the contact angle between the surface and water and promoting the spreading of droplets. However, the effect is only temporary, as the surfactants gradually are washed off the glass surface.

We have now found that surfaces consisting of an inorganic oxide glass have a reduced tendency to mist over when exposed to humid air when compared with the misting which is produced on articles of normal silicate glass under the same conditions, provided the inorganic oxide glass is of defined composition, and also provided the glass has a defined maximum transformation temperature.

According to the present invention there is provided an optical article at least part of the surface of which is an inorganic oxide glass having a $P_2O_5$ content of at least 52 mole %, an alkaline earth oxide content of 2.7 to 20 mole %, and a transformation temperature of not greater than 300° C.

Articles made from the aforementioned inorganic oxide glass may be non-misting under certain conditions of humidity and temperature, that is, they may exhibit no misting and this, of course, is preferred. However, under some conditions of humidity and temperature the glasses may show some misting but the amount of misting will be less than that obtained with normal silicate glass under the same conditions.

The transformation temperature is defined as the value determined by differential thermal analysis of a sample of the glass using the DuPont Differential Thermal Analyser according to the following procedure. A sample of the powdered glass and a reference sample of pure powdered silica are heated at a programmed rate of temperature increase of 20° C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

By 'optical articles' we mean articles capable of transmitting or reflecting an optical image by a process involving transmission of light through at least the region adjacent to the surface comprising the inorganic oxide glass. This definition includes lenses, prisms, mirrors, windows and transparent containers. Particularly useful optical articles include spectacle lenses, especially toughened lenses for safety spectacles, protective goggles and the like. Such lenses may be coloured, for example for use in welders' goggles. Other particularly useful articles are mirrors which are intended for use in humid environments, for example bathroom mirrors and dental mirrors; windows, particularly vehicle and aeroplane windows; and components of sports equipment, for example face plates and lenses of masks and goggles, e.g. underwater diving masks and ski goggles.

Only that part of the surface of the article which is required to have reduced misting properties need be of the inorganic oxide glass having the defined composition. For example, the article may be a window or windscreen which is a laminate and which has one outer surface of the inorganic oxide glass and the other outer surface of normal silicate glass. Thus, in the case of a vehicle windscreen the inner surface may with advantage be of the defined inorganic oxide glass. Of course, substantially the whole of the surface of the optical article article may, if desired, be of the defined inorganic oxide glass. The optical article may be made substantially completely of the defined inorganic oxide glass.

It is conjectured that the reduced misting property of the inorganic oxide glasses in the optical articles of the present invention is due to the presence of hygroscopic P-OH groups on the surface of the glass, although it is to be understood that this possible explanation is not to be construed as in any way limiting the present invention. It is preferred that the glass comprise at least 55 mole % of $P_2O_5$ as such glasses show an improved anti-misting effect due, it is believed, to an improved surface hygroscopicity. On the other hand, glasses comprising more than 68.5 mole % of $P_2O_5$, although they have a reduced tendency to mist, may have a surface which becomes undesirably tacky upon exposure to moisture and for this reason it is preferred that the inorganic oxide glass comprises from 55 to 68.5 mole % of $P_2O_5$, and more preferably from 58 to 65 mole % of $P_2O_5$.

In order to reduce still further the tendency of the optical articles to mist over it is preferred that the inorganic oxide glass contains at least 5 mole % and more preferably at least 10 mole % of at least one alkali metal oxide. Particularly suitable alkali metal oxides are $Li_2O$ or $Na_2O$ or a mixture thereof. The inorganic oxide glass may contain $K_2O$ as alkali metal oxide but as $K_2O$ may have an adverse effect on the durability of the glass to water the amount of $K_2O$ in the glass is preferably less than 5 mole %, more preferably less than 1 mole %.

The alkaline earth oxide may be one or more oxides of beryllium, magnesium, calcium, strontium or barium with MgO, CaO and BaO or mixtures of any two or more thereof being preferred. As the content of alkaline earth oxide in the inorganic oxide glass increases the durability of the glass to water improves although at high contents of alkaline earth oxide within the range 2.7 to 20 mole % the transformation temperature may be somewhat higher than is desired. Preferred ranges of alkaline earth oxide contents in the inorganic oxide glass are 3.6 to 15 mole % and 3.6 to 10 mole %.

The inorganic oxide glass preferably contains at least one network-forming oxide other than $P_2O_5$ in order to improve the durability of the glass to water. Examples of such network-forming oxides are $B_2O_3$, $Bi_2O_3$, $As_2O_3$, $Sb_2O_3$, $GeO_2$, $TiO_2$, $V_2O_5$, $WO_3$, $MoO_3$, $CrO_3$, $Al_2O_3$ and $SiO_2$. However, if $Al_2O_3$ or $SiO_2$ or both are present, the total proportion of $Al_2O_3$ plus $SiO_2$ must not exceed 2 mole %. The much preferred additional network-forming oxide is $B_2O_3$, which is preferably present to the extent of 1.2–3.5 mole %.

Other oxides which may be present include, but are not limited to, PbO, ZnO and CdO. Colouring materials may be added if desired, for example oxides of Fe, Cu, Co and U, in addition to oxides already mentioned for example $CrO_3$, $MoO_3$, $WO_3$ and $V_2O_5$.

It is to be understood, of course, that the oxides other than $P_2O_5$ and alkaline earth oxide which may be present in the inorganic oxide glass and the amounts thereof must be chosen such that the transformation temperature of the glass is not greater than 300° C.

Where the inorganic oxide glass has a low transformation temperature then the surface of the glass in the optical article may be somewhat tacky, especially where the glass comprises a high proportion of $P_2O_5$, and for this reason it is preferred that the glass have a transformation temperature of at least 190° C and more preferably a transformation temperature in the range 220° to 275° C.

The inorganic oxide glasses for use in the optical articles of the present invention may be prepared by heating together the appropriate oxides, or their precursors. By 'precursor' is meant a compound which on heating will react with the other components present to give the same chemical composition in the product as if the oxide had been used. Usually this reaction will occur with evolution of one or more volatile compounds, for example water, carbon dioxide and ammonia. Thus, suitable precursors of phosphoric oxide include phosphoric acid and ammonium phosphates, while carbonates may be used as precursors of metal oxides. A single compound may be a precursor of more than one oxide. For example, sodium phosphate may be a precursor of $Na_2O$ and $P_2O_5$.

The heating may be carried out in a two-stage process, in which some or all of the components are first heated together at a relatively low temperature, for example 300°–500° C, to give a glassy mixture (conveniently referred to as the premelt), which is then refined at a higher temperature, for example 500°–800° C. The duration of the first stage of the heating process, to form the premelt, is generally from 1 to 8 hours. When preparing a 2 Kg batch, a time of 2½ to 4½ hours is convenient. If less than all of the components are present at the initial heating stage the remaining material may be added subsequently, before or during the refining stage. This method is convenient for small scale laboratory preparations, but alternatively the components may be mixed together and heated, for example to 500°–800° C, in a single stage operation. The addition of the components may be made all at once or sequentially in a batch process, but it may be desirable, particularly when operating upon a large scale, to form the glass in a continuous process in which the mixture of components is continually or periodically being added to, and glass removed from, a reaction vessel maintained at the refining temperature.

During the refining stage water is gradually lost, the glass network becomes more highly crosslinked, and the viscosity and transformation temperature of the glass increase. Small amounts of volatile oxide components, for example $P_2O_5$, may be lost during the refining stage, and it is desirable to keep the temperature below 800° C when refining the glasses in order to minimise any such loss. The residual water in the glasses may represent up to 5% preferably less than 1% by weight of the total, but it is not included in the compositions set out below, which may be regarded as nominal molar compositions in that they are based upon the composition of the initial mixture of the components.

A glass of a given composition may have a range of transformation temperatures depending upon the refining conditions up to a limiting value determined by the composition. Inorganic oxide glasses for use in optical articles according to the invention having transformation temperatures within the preferred range of 190°–300° C may be obtained by routine experimentation involving selection of the appropriate process conditions, for example time, temperature and batch size, in the refining step. The length of refining time required for a particular glass composition to reach a particular transformation temperature cannot be specified as it depends upon the size of the batch, the type of furnace and crucible used, the exact temperature of the furnace, the furnace atmosphere and other variables. In general, the refining time may vary from 1 hour to 1 week, depending upon the desired transformation temperature and the variables listed above. The time required may be substantially reduced by bubbling an inert gas, for example air, through the molten glass during the refining stage. However, if a given glass composition is refined until it reaches a given transformation temperature, properties such as durability and refractive index will be reproducible from one batch of that composition to another. In general, the durability to water of a given glass composition increases with its transformation temperature.

The durability of glasses is a function of the rate at which they are attacked by water, which may be expressed either as the rate of loss of weight of a standard sample expressed in units of %/minute at a given temperature, or as the rate of erosion of a glass surface expressed in units of microns/minute at a given temperature, and in the present application both measurements are used, the relevant units being indicated in each case. A low rate of attack by water corresponds to a high durability and vice versa.

The rate of loss of weight at 100° C is determined by the following procedure. Approximately 2g of molten glass is poured on to a steel plate and allowed to cool. The resulting smooth disc of glass, approximately 2 cm in diameter and 0.3 cm thick, is weighed, immersed in boiling water for 1 hour, dried and reweighed. The weight loss divided by the initial weight and multiplied by 100/60 gives the percentage weight loss/minute.

For glasses having good durability an alternative test method in which the rate of erosion of the surface at 20° C is measured gives more accurate results. According to this procedure, the glass is ground and sieved to provide approximately 10g of glass powder of particle size 300–500µm (30–52 mesh BS 410). Approximately 5g of the powdered glass is added to a weighed sintered glass crucible having a No. 3 sinter, that is, a sinter having an average pore diameter of 20–30µm. The contents of the crucible are washed with distilled water then with acetone and dried under a vacuum of less than 1 mm Hg air pressure at room temperature for 30 minutes.

The crucible and its contents are weighed accurately to determine the initial weight of the glass. A constant-head device is then arranged to maintain a level of 3 cm of distilled water at 20° C in the crucible, which ensures that water flows through the sinter at a rate of approximately 4 ml/minute.

After 24 hours the crucible and its contents are washed with acetone, dried in vacuum as described above and reweighed to determine the final weight of the glass. The rate of erosion is calculated from the equation $$X = 0.28 \left[ 1 - \left(\frac{W_2}{W_1}\right)^{1/3} \right]$$

where $X$ = rate of erosion ($\mu$m/minute)
$W_1$ = initial weight of glass (g)
$W_2$ = final weight of glass (g)

The mean of two determinations is taken. As a rough indication of the correlation between the two methods, a weight loss at 100° C of 0.01%/minute corresponds approximately to a rate of surface erosion at 20° C of 2 $\times$ 10$^{-4}$ $\mu$m/minute.

It is preferred that inorganic oxide glasses in the articles according to the invention have a rate of surface erosion at 20° C of less than 10$^3$ $\mu$m/minute corresponding approximately to less than 0.05%/minute weight loss at 100° C.

A glass may be said to have non-misting properties if a surface of the glass remains clear when it is equilibrated in air at normal ambient temperatures and at least 50% relative humidity then cooled to below the dew point of the surrounding atmosphere. This may be tested in an apparatus in which identical samples of the test glass and of silicate glass are enclosed in an atmosphere of controlled humidity and cooled by contact with a cooling surface.

Figure 2:
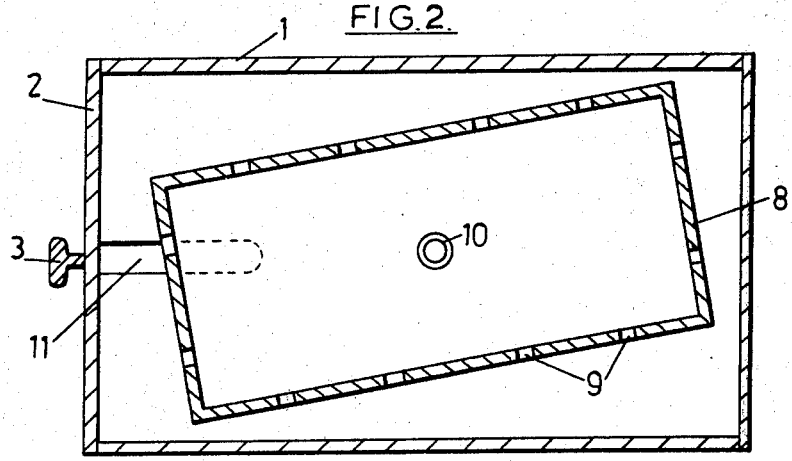

The apparatus is shown in the accompanying drawings, in which FIG. 1 is a sectional elevation and FIG. 2 is a section of the line AA' of FIG. 1.

The apparatus comprises a rectangular case 1 of polymethylmethacrylate sheet having one hinged side 2 which may be opened by a handle 3.

The case is divided into two regions 4, 5 by a thin metal sheet 6. The region 4 above the sheet 6 may be supplied through an inlet tube 7 with air at controlled humidity which may escape around the edges of the hinged side 2. Under the metal sheet 6 is a rectangular metal box 8 the top of which is formed by the sheet 6. The sides of the box 8 are formed with holes 9, and a tube 10 leads from the base of box 8 through the case 1 to a supply of CO$_2$ gas and a valve (not shown).

In use, a disc 12 of the test glass and a silicate glass reference disc 13 of the same dimensions are placed on the sheet 6, the case is closed, air of 50% relative humidity is supplied through tube 7, and the CO$_2$ supply turned on. When the valve is opened CO$_2$ gas expands into the box 8, cooling the metal walls and top of the box, and escapes through holes 9 into the region 5 of the case and thence through a slot 11 in the base of the case to the atmosphere. The point at which the silicate glass disc mists over is noted, and the condition of the test disc is observed at that time. The test glass is non-misting if it remains clear after the silicate glass has misted over.

It will be appreciated that excessive cooling may cause water to be deposited upon the inorganic oxide glass in the form of ice. Such icing is not considered to be "misting", and it is not contended that articles according to the invention will be non-icing.

Alternative and simpler tests which may be applied as misting tests include a. cooling a sample of the test glass to 0° C and removing to an atmosphere at 20° C, 80% relative humidity,
b. placing the glass which has been equilibrated at any temperature between 0° C and 30° C into an atmosphere at 37° C, 100% relative humidity, and
c. subjecting a sample of the test glass at 20° C to the human breath (37° C, 100% relative humidity).

The glass may be regarded as non-misting if it does not mist under any one of these test conditions, and as having reduced misting or anti-misting properties if it mists to a lesser extent, or for a shorter time, than does a silicate glass under the same conditions.

If glasses which are non-misting or have anti-misting properties after equilibration under ambient conditions are stored for a period of time under conditions of low humidity and/or low temperature their non-misting or antimisting effect may be lost, but it will be recovered on re-exposure to more humid conditions. Thus certain of the glasses, particularly those having P$_2$O$_5$ contents in the lower part of the range, i.e. from 52 to 58 mole %, may lose their non-misting property after prolonged storage at 0° C and relative humidities as high as 54% but will recover the property upon equilibration under normal conditions. 'Ambient conditions' may be regarded as temperatures between 15° and 40° C and relative humidity not less than 50%. The period of storage at low humidity and/or temperature required to cause loss of non-misting properties or reduction of anti-misting properties is usually between 1 day and 1 week, whereas exposure to normal ambient conditions may bring about recovery of non-misting properties within a few hours. Recovery may be accelerated by exposure to an atmosphere of high humidity at ambient temperature, and may then take place within a few minutes.

Non-misting or anti-misting properties may also be reversibly lost if glasses are thoroughly washed in water and wiped dry. Again, equilibration under ambient conditions will restore the non-misting or anti-misting property, generally within a few hours or less.

Inorganic oxide glasses having a refractive index in the range 1.51 to 1.53 are particularly useful for making spectacle lenses, and glasses having a P$_2$O$_5$ content of from 58 to 65 mole %, B$_2$O$_3$ 2 to 2.5 mole %, PbO 4 to 6 mole %, Na$_2$O 12 to 20 mole % the balance preferably being Li$_2$O, CaO and MgO may be particularly useful in this application as certain glasses within this composition range may be made to conform to the specification for white ophthalmic crown glass in British Standard BS 3062 of 1959 which specifies a refractive index of 1.523 $\pm$ 0.001.

Similar glass compositions in which the PbO is replaced at least in part by other heavy metal oxides, for example WO$_3$ or Sb$_2$O$_3$, may be selected to have refractive indices in the aforementioned ranges.

The constringence (V) of a glass may be calculated from the formula $$V = \frac{n_D - 1}{n_F - n_C}$$

where $n_D$, $n_F$ and $n_C$ are the refractive indices of the glass measured at the helium D line (5876A), the hydrogen F line (4861A) and the hydrogen C line (6563A) respectively. Glasses are arbitrarily designated by terms such as "hard crown", "barium flint", etc according to the region in which they lie on a graph of refractive index against constringence; thus, for example, hard crown glasses are those of $n_D$ 1.500–1.540 and V 58–62. Glasses in the optical articles according to the present invention may fall into a number of these categories, from borosilicate crown to ultra light flint.

Where the optical articles of the invention are made entirely from inorganic oxide glass as herein described they may be fabricated by any suitable means including hot-pressing or injection-moulding on conventional plastics processing equipment. Such forming operations may be followed by finishing operations such as grinding and polishing, but it may be feasible to produce a finished article in a single operation, for example by injection-moulding a spectacle lens. Spectacle lenses according to the invention may be plain lenses or ophthalmic corrective lenses, and may be toughened by processes well known for silicate glass lenses. For example they may be heated briefly to 500° C then cooled rapidly in a stream of cold air.

Alternatively, the articles may be laminates of two or more layers. In the case of two-layer laminates one layer may be composed of the inorganic oxide glass and the other may be of silicte glass or plastics material. Thus, for example, a thin layer of the inorganic oxide glass which is non-misting or anti-misting may be laminated to a pane of silicate glass to give a non-misting or anti-misting glass suitable, for example, for car rear windows and bathroom mirrors. In the case of laminates of three or more layers, one or both of the outer layers may be composed of the inorganic oxide glass, and the other layers may be of other materials. As an example of this type of laminate, a vehicle windscreen may be made with one outer layer of silicate glass, an inner layer of tough plastics material, for example polyvinyl butyral, and a second outer layer of inorganic oxide glass. Such a windscreen installed with the inorganic oxide glass surface on the interior of the vehicle will exhibit greatly reduced misting of the interior surface in cold weather. As a further example, a mirror may be formed from an outer layer of the inorganic oxide glass, a layer of silicate glass, a reflective layer of silver and an opaque backing sheet.

A sheet of transparent plastics material, for example polymethyl methacrylate, may have thin sheets of inorganic oxide glass laminated to one or both surfaces to provide both scratch-resistance and non-misting or anti-misting properties.

Laminates comprising at least one outer layer of inorganic oxide glass may be made by a variety of processes. For example a laminate comprising one layer of inorganic glass and one layer of polymethyl methacrylate may be made by processes including contacting a preformed inorganic oxide glass sheet with monomer and bringing about polymerisation of the monomer; by extrusion of inorganic oxide glass sheet and polymer sheet from adjacent extruders and bringing them into contact in the heat-softened state; and by sticking preformed sheets of inorganic oxide glass and polymer together by means of adhesive.

It is of course desirable in making laminated articles to match as closely as possible the thermal coefficients of expansion of the different layers in order to avoid delamination caused by changes in temperature. The need to match coefficients of expansion is, however, less compelling if one layer is extremely thin or if an intervening layer such as an adhesive is sufficiently flexible to accommodate some of the strain caused by differential expansion. Flexible polyurethane resins may be suitable adhesives for this purpose.

Laminates of inorganic oxide glass to silicate glass may be made by processes including sticking together preformed sheets with a suitable adhesive; melting inorganic oxide glass powder on the surface of newly formed silicate glass sheet while the latter is still hot; sintering inorganic glass powder upon the surface of preformed silicate glass sheet and flame-spraying inorganic oxide glass upon a silicate glass surface.

Methods such as powder coating, sintering, flamespraying, sputtering and vacuum evaporation may also be used to produce a thin coating of inorganic oxide glass upon shaped articles, for example lenses, formed from other glass or plastics materials, thereby providing an article with substantially permanent non-misting or anti-misting properties.

The invention is further illustrated by the following Examples.

EXAMPLE 1

A phosphate glass having the composition (mole %) $P_2O_5$ 68.3, $B_2O_3$ 2.44, $Na_2O$ 14.62, $Li_2O$ 4.88, MgO 4.88, CaO 4.88, a transformation temperature of 155° C and a rate of erosion in water of $4.0 \times 10^{-4}$ μm/min at 20° C was cast into a sheet. This sheet, together with similar sheets of 'Pyrex' (Pyrex is a Registered Trade Mark) glass and ordinary window glass was placed in a refrigerator at 0° C for 15 minutes then withdrawn into an atmosphere at 20° C and 80% relative humidity. Both the Pyrex glass and the window glass rapidly misted over, while the phosphate glass remained clear and unmisted.

EXAMPLE 2

A phosphate glass having the composition (mole %) $P_2O_5$ 71.8, $B_2O_3$ 2.56, $Na_2O$ 10.3, $Li_2O$ 10.3, BaO 5.1, a transformation temperature of 153° C and a rate of erosion in water of $4.9 \times 10^{-4}$ μm/min at 20° C was used to prepare plain lenses by injection moulding. The lenses were fitted into one of the eyepieces of each of a number of welder's goggles. The other eyepiece in each goggle was fitted with an ordinary silicate glass lens. The goggles were exposed to a stream of cold air on one side and warm moist air on the other side. The silicate glass lenses misted over in a few seconds whereas the phosphate glass lenses remained clear and transparent for 1 hour.

A glass of the same composition but refined for a shorter time and having a transformation temperature of 125° C and a rate of erosion in water of $2.5 \times 10^{-3}$ μm/min at 20° C was cast into a sheet. The sheet did not mist over when cooled to 0° C then removed to air at 20° C, 80% humidity, but its surface had a slightly sticky feeling.

EXAMPLE 3

A phosphate glass having the following composition (mole %) $P_2O_5$ 55.9, PbO 20.6, $K_2O$ 18.7, MgO 2.4, BaO 1.2, $V_2O_5$ 1.2, a transformation temperature of 192° C and a rate of erosion in water at 20° C of $1.1 \times 10^{-4}$ μm/min was cast into a sheet. This sheet, together with a similar sheet of ordinary window glass, was placed in a refrigerator at 0° C for 15 minutes and then withdrawn into an atmosphere at 20° C, 80% relative humidity. The window glass rapidly and completely misted over, whereas the phosphate glass showed only a slight degree of misting, which did not appear as rapidly as did the misting on the window glass.

EXAMPLE 4

A glass having the composition (moles %) $P_2O_5$ 63.1, $B_2O_3$ 2.25, $Na_2O$ 13.5, $Li_2O$ 7.65, MgO 4.5, CaO 4.5, PbO 4.5 was made by heating the following components together at 300°–350° C to form a premelt.

| Oxide | Component | Weight (g) |
|---|---|---|
| $P_2O_5$ | 88% $H_3PO_4$ | 1558 |
| $B_2O_3$ | $B_2O_3$ | 17.5 |
| $Na_2O$ | $Na_2CO_3$ | 159 |
| $Li_2O$ | $Li_2CO_3$ | 62.7 |
| CaO | $CaCO_3$ | 50.0 |
| MgO | MgO | 20.5 |
| PbO | PbO | 111.7 |

The premelt was refined at 700° C for 16 hours to give a clear colourless glass of transformation temperature of 230° C and refractive index $n_D$=1.523.

A disc of this glass was cooled in the apparatus shown in FIGS. 1–2 together with a disc of silicate glass of the same dimensions. The phosphate glass still remained clear when the silicate glass had misted over.

Discs of the above phosphate glass were ground and polished to give spectacle lenses having non-misting properties.

One polished lens was toughened by heating to 500° C for 2 minutes, then cooling in a stream of cold air. The lens was placed in an atmosphere at 37° C, 100% relative humidity and did not mist. Its toughness was satisfactory when tested by British Standard 2092.

EXAMPLE 5

A thin sheet of the glass of Example 4 (25 × 50 × 0.1 mm) was laminated to 25 × 50 × 3 mm sheet of polymethyl methacrylate using a polyurethane adhesive prepared by mixing 100 parts by weight of MDI(-diisocyanatodiphenylmethane) and 160 parts of a polyol having an equivalent weight of 200.

The resulting laminate was tough, transparent, and the glass surface had good scratch resistance and did not mist over when placed in an atmosphere of 100% relative humidity at 37° C.

EXAMPLE 6

A flat disc of the glass of Example 4 was polished to to give smooth flat faces, then degreased by washing in dilute sodium hydroxide solution and then distilled water. It was immersed in a 2% aqueous stannous shloride solution, then washed again with distilled water.

The disc was then stood on edge in a beaker containing a mixture of equal volumes of Rochelle salt silvering solutions A and B (as described in Handbook of Chemistry and Physics, 36th Edition, p. 2998) and removed after 20 minutes, when a continuous silver film had been deposited on the surface. The disc was washed with distilled water and dried in air.

The silvered disc was then electroplated with a layer of copper, and to one face was applied a backing layer of polyurethane resin. The copper and silver deposits on the other face were removed by grinding and polishing, giving a silvered-glass mirror whose surface did not mist when breathed upon.

EXAMPLE 7

From a cast block of glass made as described in Example 4 was cut a right equiangular prism whose faces were then ground and polished flat. The prism could be used to produce a spectrum from visible light, and its faces were non-misting on exposure to air at 37° C, 100% relative humidity.

EXAMPLES 8 to 12

Glasses of compositions shown in Table 1 prepared by premelting appropriate oxides or precursors therefor at 300°–350° C followed by refining at 700° C and having refractive indices in the range 1.50 to 1.51 are suitable for use in non-misting mirrors and windows or for the preparation of laminates. The transformation temperatures of these glasses were kept within the desired range by control of the refining conditions. The glasses were cast into flat discs which were transparent and non-misting when breathed upon.

Table 1

| Example No. | Compositions in Mole % | | | | | | | |
|---|---|---|---|---|---|---|---|---|
| | $P_2O_5$ | $B_2O_3$ | $Na_2O$ | $Li_2O$ | MgO | CaO | BaO | SrO |
| 8 | 68.3 | 2.4 | 14.6 | 4.9 | 4.9 | 4.9 | — | — |
| 9 | 65.1 | 2.3 | 18.6 | 2.3 | 4.7 | 7.0 | — | — |
| 10 | 64.5 | 2.3 | 13.8 | 4.6 | 4.6 | 4.6 | — | 5.5 |
| 11 | 64.5 | 2.3 | 13.8 | 4.6 | 4.6 | 4.6 | 5.5 | — |
| 12 | 60.5 | 2.3 | 18.6 | 9.3 | 4.7 | 4.7 | — | — |

Some properties of the glasses of Examples 9, 10 and 11 are given in Table 2.

Table 2

| Example No. | Transformation Temperature (° C) | Rate of Attack by Water (%/min. at 100° C) | $n_D$ | V | Glass Type |
|---|---|---|---|---|---|
| 9 | 177 | — | 1.501 | | |
| 10 | 188 | .003 | 1.508 | 50–54 | Extra light flint |
| 11 | 202 | .002 | 1.5085 | | |

EXAMPLES 13 to 21

Glasses of compositions shown in Table 3 prepared by premelting the appropriate oxides or precursors therefor at 300°–350° C followed by refining at 700° C have refractive indices in the range 1.51 to 1.545 and are suitable for use in the production of lenses, prisms, mirrors, windows and laminates. The glasses of Examples 13–19 have refractive indices close to that of white ophthalmic crown glass (1.523), whereas the glasses of Examples 20 and 21 have somewhat higher refractive indices.

Samples of the glasses were cast into flat discs which were transparent and non-misting when breathed upon.

Table 3

| Example No. | Composition (Moles %) | | | | | | |
|---|---|---|---|---|---|---|---|
| | $P_2O_5$ | $B_2O_3$ | $Na_2O$ | $Li_2O$ | CaO | MgO | PbO |
| 13 | 59.9 | 2.3 | 18.4 | 4.6 | 4.6 | 4.6 | 5.5 |
| 14 | 60.5 | 2.3 | 18.6 | 4.7 | 4.7 | 4.7 | 4.7 |
| 15 | 64.5 | 2.3 | 13.8 | 4.7 | 4.6 | 4.6 | 5.5 |
| 16 | 63.0 | 2.2 | 13.5 | 7.6 | 4.5 | 4.5 | 4.6 |
| 17 | 62.8 | 2.2 | 13.5 | 7.6 | 4.5 | 4.5 | 4.9 |
| 18 | 60.4 | 2.1 | 18.6 | 4.6 | 4.6 | 4.6 | 5.1 |
| 19 | 60.1 | 2.1 | 18.5 | 4.6 | 4.6 | 4.6 | 5.4 |
| 20 | 64.1 | 2.3 | 13.7 | 4.6 | 4.6 | 4.6 | 6.1 |
| 21 | 57.8 | 2.2 | 17.8 | 4.4 | 4.4 | 4.4 | 8.9 |

Properties of these glasses are given in Table 4.

Table 4

| Ex. No. | Transformation Temperature (° C) | Rate of Attack by Water (%/min at 100° C) | $n_D$ | V | Glass Type |
|---|---|---|---|---|---|
| 13 | 190 | — | 1.522 | — | |
| 14 | 212 | — | 1.518 | — | |
| 15 | 190 | 0.003 | 1.524 | 58–64 | Hard crown |
| 16 | 174 | 0.004 | 1.522 | 45–50 | Extra light flint |
| 17 | 230 | — | 1.525 | — | |
| 18 | 205 | — | 1.524 | — | |
| 19 | 211 | 0.004 | 1.526 | 52.56 | Extra light flint |
| 20 | 195 | — | 1.528 | — | |
| 21 | 204 | — | 1.540 | — | |

Table 5

| Example No. | Composition (Moles %) | | | | | | | |
|---|---|---|---|---|---|---|---|---|
| | $P_2O_5$ | $B_2O_3$ | $Na_2O$ | $Li_2O$ | MgO | CaO | $WO_3$ | $Sb_2O_3$ |
| 22 | 60.4 | 2.1 | 18.6 | 4.6 | 4.6 | 4.6 | 5.1 | — |
| 23 | 63.0 | 2.2 | 13.5 | 7.6 | 4.5 | 4.5 | — | 4.5 |
| 24 | 70 | 2.5 | 10 | 10 | — | — | — | 7.5 |

Table 6

| Ex. No. | Transformation Temperature (° C) | Rate of Attack by Water (%/min at 100°) | $N_D$ | V | Glass Type |
|---|---|---|---|---|---|
| 22 | 191 | 0.002 | 1.521 | 40–45 | Ultra-light flint |
| 23 | 205 | 0.004 | 1.539 | 54–58 | Soft crown |
| 24 | 160 | — | 1.553 | 42–47 | Light flint |

EXAMPLES 25 and 26

These Examples illustrate optical articles made from glass having $P_2O_5$ contents below 55 mole %. Compositions are given in Table 7, properties in Table 8.

Table 7

| Example No. | Composition (Moles %) | | | | | | |
|---|---|---|---|---|---|---|---|
| | $P_2O_5$ | $B_2O_3$ | $Na_2O$ | $Li_2O$ | MgO | CaO | PbO |
| 25 | 54.1 | 2.3 | 18.0 | 6.8 | 6.8 | 6.8 | 5.4 |
| 26 | 54.5 | 2.3 | 18.2 | 7.7 | 6.8 | 6.8 | 3.6 |

Table 8

| Ex. No. | Transformation Temperature (° C) | Rate of Attack by Water (%/min at 100° C) | $N_D$ | V | Glass type |
|---|---|---|---|---|---|
| 25 | 220 | 0.002 | 1.533 | 54–60 | Soft crown hard crown |
| 26 | 252 | 0.001 | 1.525 | 59–65 | Hard crown/ borosilicate crown |

Flat discs cast from these glasses did not mist when,

EXAMPES 22 to 24

These Examples illustrate glasses containing heavy metal oxides other than lead oxide. Compositions are given in Table 5 and properties in Table 6. Samples were cast into flat discs which were transparent and non-misting when breathed on. That of Example 22, containing $WO_3$, was blue in colour.

after storage under ambient conditions, they were removed to an atmosphere at 37° and 100% relative humidity. They did, however, show some misting when, after storage at 0° C, they were placed in an atmosphere of 100% relative humidity at 37° C. This misting, however, was less than that when silicate glass discs were similarly treated.

EXAMPLE 27

This Example illustrates the effect of storage at low temperature and/or humidity upon articles of three glasses. The glasses were those of Examples 16, 26 and a lead-free glass of composition $P_2O_5$ 68.2, $B_2O_3$ 2.4, $Li_2O$ 9.75, $Na_2O$ 9.75, MgO 4.8, CaO 4.8 and transformation temperature 184° C.

Polished discs of each glass were placed in environments of differing temperature and relative humidity for 24 hours, then visually inspected for transparency. In each case nine different storage environments were tested, these being temperatures of 0° C, 15° C and 30° C and at each temperature relative humidities of 12%, 34% and 54%.

The discs of Example 26, having 54.5 mole % $P_2O_5$, were misting after storage at 0° C at all three humidity levels (but the misting was less than that observed with discs of silicate glass under the same conditions), but not after storage at the higher temperatures. The discs of Example 16 (63% $P_2O_5$) and Example 27 (68.2% $P_2O_5$) remained non-misting under all storage conditions tested.

EXAMPLE 28

A 2 in. diameter × ½ in. thick disc of a glass having the following composition (in mole %) $P_2O_5$ 75, $Li_2O$ 10, $Na_2O$ 10, BaO 5 and a transformation temperature of 192° C was placed in an atmosphere of 100% relative humidity at 19° C for 24 hours. The disc was then breathed upon. The disc did not mist over. The above procedure was repeated except that the disc was stored at 0° C and 100% relative humidity for 1 week and then breathed upon. The disc did not mist over.

By way of comparison when the above procedures were repeated with discs of silicate glass the discs in each case misted over.

EXAMPLE 29

The procedures of Example 28 were repeated with a disc of a glass having the composition (in mole %) $P_2O_5$ 63.1, $B_2O_3$ 2.3, CaO 4.5, MgO 4.5, PbO 25.6 and a transformation temperature of 211° C.

After storage at 19° C and 100% relative humidity for 24 hours the disc did not mist over when breathed upon. After storage at 0° C and 100% relative humidity for 1 week the disc did mist over when breathed upon but the misting was much less than that on a silicate glass disc which had been stored under the same conditions.

EXAMPLES 30 and 31

2 in. diameter × ½ in. thick discs of glasses having the following compositions (in mole %) were made

|  | Ex. 30 | Ex. 31 |
|---|---|---|
| $P_2O_5$ | 62.4 | 63.8 |
| $B_2O_3$ | 3.1 | 0.9 |
| $Li_2O$ | 5.4 | 7.8 |
| $Na_2O$ | 11.1 | 13.7 |
| CaO | 6.7 | 4.6 |
| MgO | 6.7 | 4.6 |
| PbO | 4.6 | 4.6 |
| Transformation temperature ° C | 270 | 224 |

The discs were stored for 24 hours at 19° C and 100% relative humidity and then breathed upon. Neither disc misted over.

The discs were stored 0° C and 100% relative humidity for 1 week and then breathed upon. The disc of Example 30 showed a slight misting over and the disc of Example 31 did not mist over.

By way of comparison the above test procedures were repeated with discs of glasses having the following compositions:

| $P_2O_5$ | 40 | 50 |
|---|---|---|
| $B_2O_3$ | 2 | 2 |
| $Li_2O$ | 8 | 8 |
| $Na_2O$ | 20 | 15 |
| CaO | 2.5 | 2.5 |
| MgO | 2.5 | 2.5 |
| PbO | 25 | 20 |
| Transformation temperature ° C | 287 | 250 |

Each disc showed considerable misting over when breathed upon after storing both at 19° C and 100% relative humidity for 24 hours and at 0° C and 100% relative humidity for 1 week.

EXAMPLES 32 and 33

2 in. diameter × ½ in. thick discs of glasses having the following compositions (in mole %) were made:

|  | Ex. 32 | Ex. 33 |
|---|---|---|
| $P_2O_5$ | 63 | 63 |
| $B_2O_3$ | 2 | 2 |
| $Li_2O$ | 3 | 2 |
| $Na_2O$ | 10 | 5 |
| CaO | 4 | 4 |
| MgO | 4 | 4 |
| PbO | 14 | 20 |
| Transformation temperature ° C | 284 | 260 |

After storing at 19° C and 100 % relative humidity for 24 hours the disc of Example 32 did not mist over when breathed upon and the disc of Example 33 showed slight misting over.

After storing at 0° C and 100% relative humidity for 1 week the discs of Examples 32 and 33 showed a slight misting over when breathed upon.

By way of comparison discs of silicate glasses when breathed upon showed considerable misting over after storage at 19° C and 100% relative humidity for 24 hours and after storage at 0° C and 100% relative humidity for 1 week.

We claim:

1. An optical article at least part of the surface of which is an inorganic oxide glass having a $P_2O_5$ content of at least 52 mole %, an alkaline earth oxide content of 2.7 to 20 mole %, said percentages based on 100% of the total composition, and a transformation temperature range of not greater than 300° C.

2. An optical article the whole of the surface of which is an inorganic glass as defined in claim 1.

3. An optical article as claimed in claim 2 which is made of an inorganic oxide glass.

4. An optical article as claimed in claim 1 in which the inorganic oxide glass comprises at least 55 mole % of $P_2O_5$.

5. An optical article as claimed in claim 4 in which the inorganic oxide glass comprises from 55 to 68.5 mole % of $P_2O_5$.

6. An optical article as claimed in claim 5 in which the inorganic oxide glass comprises from 58 to 65 mole % of $P_2O_5$.

7. An optical article as claimed in claim 1 which contains $B_2O_3$ in a proportion of 1.2 to 3.5 mole %.

8. An optical article as claimed in claim 1 in which the inorganic oxide glass comprises at least 5 mole % of at least one alkali metal oxide.

9. An optical article as claimed in claim 8 in which the inorganic oxide glass comprises at least 10 mole % of at least one alkali metal oxide.

10. An optical article as claimed in claim 8 in which in the inorganic oxide glass the alkali metal oxide is $Li_2O$, $Na_2O$, or a mixture thereof.

11. An optical article as claimed in claim 1 in which the inorganic oxide glass contains PbO in a proportion of 4 to 6 mole %.

12. An optical article as claimed in claim 1 in which the inorganic oxide glass comprises from 3.6 to 15 mole % of alkaline earth oxide.

13. An optical article as claimed in claim 12 in which the inorganic oxide glass comprises from 3.6 to 10 mole % of alkaline earth oxide.

14. An optical article as claimed in claim 1 in which the inorganic oxide glass has a refractive index in the range 1.51 to 1.53.

15. An optical article as claimed in claim 14 in which the inorganic oxide glass has a composition $P_2O_5$ 58 to 65 mole %, $B_2O_3$ 2 to 2.5 mole %, PbO 4 to 6 mole %, $Na_2O$ 12 to 20 mole %, the balance being $Li_2O$, CaO and MgO.

16. An optical article as claimed in claim 1 in which the inorganic oxide glass has a transformation temperature in the range 190° to 300° C.

17. An optical article as claimed in claim 16 in which the inorganic oxide glass has a transformation temperature in the range 220° to 275° C.

18. An optical article which is a laminated structure at least an outer surface of which is an inorganic oxide glass. As claimed in claim 1.

19. An optical article as claimed in claim 1 which is capable of transmitting an optical image by a process involving transmission of light through said glass.

* * * * *